Patented Feb. 11, 1936

2,030,294

UNITED STATES PATENT OFFICE 2,030,294

STAIN COVER

Leo L. Hazel, Portland, Oreg.

No Drawing. Application January 15, 1935,
Serial No. 1,953

1 Claim. (Cl. 134—79)

This invention relates to a composition of matter to be applied to any soiled or stained surface for the purpose of covering the stains and providing a permanent coating thereover which is adapted to receive any number of applications of paint or any other finishing material.

The principal object of my invention is the provision of a composition as above pointed out, which also will provide a super-surface with sufficient binding qualities to receive and permanently hold any finishing surface or materials applied thereto.

My composition consists of a mixture of pontianak gum, resin, denatured alcohol, celluloid scraps, methyl acetone, benzol, castor oil, eithopone, and ultra-marine blue.

In preparing the composition, I prefer to use the foregoing ingredients in about the following proportions and in the following groups which will be identified hereinafter as Groups 1, 2, 3, 4, 5, and 6. It is necessary that the composition be made by first dividing the ingredients into groups and following the preparation of each group, the groups themselves are then mixed to produce the composition in its final form.

The ingredients and their proportions for each of said groups is as follows:

Group 1

| | |
|---|---|
| Pontianak gum | 25 lb. |
| White resin | 25 lb. |
| Denatured alcohol | 25 gal. |

These ingredients which constitute Group 1 are placed in an agitator, thoroughly mixed and made ready for mixing with certain of the other of said groups.

Group 2

| | |
|---|---|
| Celluloid scraps | 28 lb. |
| Denatured alcohol | 5 gal. |
| Methyl acetone | 5 gal. |

These ingredients are likewise placed in an agitator and thoroughly mixed together.

Group 3

The ingredients of this group consist of 10 gallons of the composition produced in Group 1, 10 gallons of which are mixed with 20 gallons of benzol to constitute this Group 3.

Group 4

The ingredients of this group consist of all of the composition of Group 2 mixed with the composition of all of the ingredients of Group 3, thoroughly mixed and strained.

Group 5

The ingredients of this group consist of 5 gallons of the composition produced by the mixture of the ingredients of Group 1 together with the following ingredients in the following proportions:

| | |
|---|---|
| Benzol | 5 gal. |
| AA castor oil | 2 oz. |
| Ultra-marine blue | ½ oz. |
| Lithopone | 54 lb. |

Group 6

The ingredients of this group consist of all of Group 4 thoroughly mixed with all of Group 5, and following this thorough mixture, the composition is placed in cans or other suitable receptacles for selling purposes.

My invention produces a very efficient and permanent wall covering which is not limited to the mere covering of stains and the like, but is also adapted for complete wall covering. Due to its qualities which cause it to adhere without cracking, it adheres to the surface to which it is applied, and in its entirety possesses in a high degree all the necessary properties of a permanent stain cover and surface treatment to receive any and all other surface coatings or treatments which may be thereafter applied to the surface.

I claim:

A composition adapted to form a permanent and non-crackable surface treatment particularly adapted to cover stains and to form a permanent cover thereover, comprising: pontianak gum, resin, denatured alcohol, celluloid scraps, methyl acetone, benzol, castor oil, lithopone, and ultra-marine blue.

LEO L. HAZEL.